(12) United States Patent
Vaccaro

(10) Patent No.: US 8,047,709 B1
(45) Date of Patent: Nov. 1, 2011

(54) METHOD AND SYSTEM FOR INTERFACE DETECTION

(75) Inventor: Mark J. Vaccaro, Wakefield, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 462 days.

(21) Appl. No.: 12/386,182

(22) Filed: Mar. 27, 2009

(51) Int. Cl.
 - *G01N 25/00* (2006.01)
 - *G01K 13/00* (2006.01)
 - *G01K 3/08* (2006.01)
 - *G01K 3/10* (2006.01)
 - *G01K 3/14* (2006.01)

(52) U.S. Cl. ..... 374/45; 374/136; 374/137; 73/862.391; 73/170.33; 33/1 R; 33/1 N; 700/299; 114/382; 405/175

(58) Field of Classification Search ............ 374/45, 374/136, 137; 73/862.391, 170.33; 700/299; 405/175; 114/247, 382; 33/1 R
See application file for complete search history.

(56) References Cited

U.S. PATENT DOCUMENTS

| | | | | |
|---|---|---|---|---|
| 3,541,501 | A * | 11/1970 | Jones et al. | 367/123 |
| 4,044,473 | A * | 8/1977 | Crask | 33/333 |
| 5,198,662 | A * | 3/1993 | Yamaguchi et al. | 250/227.18 |
| 5,734,623 | A * | 3/1998 | Ruffa | 367/128 |
| 6,072,928 | A * | 6/2000 | Ruffa | 385/100 |
| 6,147,931 | A * | 11/2000 | Seaman et al. | 367/153 |
| 6,523,424 | B1 * | 2/2003 | Hayes et al. | 73/862.391 |
| 6,873,746 | B2 * | 3/2005 | Stewart et al. | 382/291 |
| 6,997,603 | B2 * | 2/2006 | Ruffa et al. | 374/137 |
| 7,496,246 | B1 * | 2/2009 | Ruffa | 385/13 |
| 2004/0208224 | A1 * | 10/2004 | Ruffa et al. | 374/137 |

* cited by examiner

*Primary Examiner* — Randy W Gibson
(74) *Attorney, Agent, or Firm* — James M. Kasischke; Michael P. Stanley; Jean-Paul A. Nasser

(57) ABSTRACT

A method and system for detecting the location of an air/sea interface on an Instrumented Tow Cable (ITC) when distributed temperature measurements are provided. The air/sea interface is determined by estimating the variance of observed temperature in the proximity of each measurement cell. The method and system described herein uses a sliding variance across the entire cable length. The variance of the cell or cells in the area of the interface has been found to be large compared to other cells. Accordingly, the location of the air/sea interface is determined based on the location of the peak variance. The location of the air/sea interface is used in determining the catenary of the ITC.

17 Claims, 2 Drawing Sheets

METHOD AND SYSTEM FOR INTERFACE DETECTION

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to the detection of an air/sea interface and more specifically to detection of the interface during distributed temperature measurements using an Instrumented Tow Cable.

(2) Description of the Prior Art

As is known in the art, an Instrumented Tow Cable (ITC) can be used to measure the ocean temperature profile in relation to depth with an order of magnitude improvement in spatial resolution as compared to other known systems.

The ITC measures the temperature along an optical fiber cable with a spatial resolution of one half meter to one meter and a temporal resolution of approximately two to three minutes. As is known to those ordinarily skilled in the art, the measurement is performed using light scattered from within optical fibers integrated into a tow cable.

The ITC uses known Optical Time Domain Reflectometry (OTDR) techniques to determine the precise location of each measurement cell along the cable length. A depth sensor at the bottom of the cable is used to determine the depth at the end of the cable. To obtain the depth of each temperature measurement, it is assumed that the entire cable tows at the same incidence angle with respect to the flow—the critical angle. The critical angle is that angle where the weight and drag of the cable balance.

For any incident angle $\delta$, the force balance on a section of cable is as follows:

$$W \cos \theta = \frac{1}{2}\rho d C_n V^2 \sin^2\theta = \frac{1}{2}\rho d C_n V^2 (1 - \cos^2\theta); \quad [1]$$

where W=the cable weight per unit length (in sea water);
$\rho$=density of water (~1000 kilograms per meter$^3$ (kg/m$^3$));
d=cable diameter;
$C_n$=normal drag coefficient (~1.5 for a jacketed cylindrical cable);
V=tow speed; and
$\theta$=incidence angle with respect to the flow.
The formula for the critical angle $\theta_c$ is as follows:

$$\cos \theta_c = -\frac{W}{\rho d C_n V^2} + \sqrt{1 + \frac{W^2}{\rho^2 d^2 C_n^2 V^4}}. \quad [2]$$

Note that when W is equal to zero, $\theta$ is also equal to zero. A neutrally buoyant cable has an incidence angle of zero, regardless of speed.

For neutrally buoyant towed array systems, the assumption of a zero critical angle tow is—in practice—very accurate. However, when a heavy variable depth body is towed, such an assumption of a critical angle is no longer valid. In the case of towing a heavy variable depth body, a lookup table needs to be generated to provide the cable catenary as a function of tow speed. Once the catenary is known and the depth is known at the end of the cable, the depth for each temperature measurement made using the ITC method can be assigned.

While the critical angle can be estimated from Equation [2], the critical angle can be measured more accurately based on the total length of the cable in the water and the total depth of that length. The total depth can be determined using the depth sensor, as described above.

What are needed are a method and system for more accurately measuring the total length of the cable in water (i.e., the length of cable from the air/sea interface to the end of the cable in the water). If the position on the cable where the cable enters the water, referred to herein as the air/sea interface, can be determined; then the total length of the cable in the water can be ascertained.

SUMMARY OF THE INVENTION

It is therefore a general purpose and primary object of the present invention to provide a method and system for detecting the location of the air/sea interface on an Instrumented Tow Cable during distributed temperature measurements.

The air/sea interface is determined by estimating the variance of observed temperature in the proximity of each measurement cell. The method and system described herein use a sliding variance over the entire cable length. As is known in the art, the variance of the cell or cells in the area of the interface has been found to be large compared to other cells. Accordingly, the location of the air/sea interface is determined based on the location of the peak variance.

In one embodiment, a method of determining a position of an interface along a temperature sensing cable passing through the interface comprises obtaining multiple temperature readings at each of a plurality of measurement cells along the cable; determining locations of the measurement cells along the cable; obtaining variance estimations in proximity of each of the locations based on the multiple temperature readings; and determining the position of the interface based on the position having the largest of the variance estimations.

In another embodiment, the variance estimations are obtained over sliding windows along the cable. The method further comprises obtaining a representative temperature for each of the locations based on the multiple temperature readings. The representative temperature can be one of an average, an arithmetic mean, a geometric mean, a mode, or a combination thereof of the multiple temperature readings at each of the plurality of measurement cells. The locations can then be determined through optical time domain reflectometry.

In yet another embodiment, the method further comprises obtaining at least one of an average, an arithmetic mean, a geometric mean and a mode of the multiple temperature readings at each of the plurality of measurement cells.

In yet another embodiment, the method further comprises the step of determining a base depth of an end of the cable beneath the interface and determining a catenary describing a shape of the cable based in part on the base depth and the position of the cable.

The method further comprises obtaining depths of the locations beneath the interface based on the catenary; obtaining representative temperatures for the locations based on the multiple temperature readings; and constructing a temperature in relation to depth profile based on the representative temperatures and the depths of the locations.

The representative temperatures can be obtained from one of an average, an arithmetic mean, a geometric mean and a mode of the multiple temperature readings at each of the plurality of measurement cells. The base depth can be determined based on a reading from a depth sensor.

The catenary can be further determined based on one or both of a tow speed of the cable and a length of the cable. The variance estimations can be obtained over sliding windows along the cable.

In one embodiment, a processor program product disposed on a processor readable medium can have instructions for causing at least one processor to receive multiple temperature readings from each of a plurality of measurement cells along a temperature sensing cable; to determine locations of the measurement cells along the cable based on optical time domain reflectometry; to obtain variance estimations over sliding windows along the cable in proximity of each of the locations based on the multiple temperature readings; and to determine a position along the cable of an interface through which the cable passes, based on the position having the largest variance estimation.

In another embodiment, the processor program product can have further instructions for causing the at least one processor to receive a base depth reading from a depth sensor at the end of the cable beneath the interface; to determine a catenary describing a shape of the cable based at least in part on the base depth and the position; to determine depths of the locations beneath the interface based on the catenary; to determine representative temperatures for the locations based on the multiple temperature readings; and to construct a temperature in relation to a depth profile based on the representative temperatures and the depths of the locations.

The processor program product can have further instructions for causing the at least one processor to determine the representative temperatures based on one or more of an average, an arithmetic mean, a geometric mean, or a mode of the multiple temperature readings at each of the plurality of measurement cells. Further instructions can cause the processor to determine the catenary based on one or more of a tow speed of the cable, or a length of the cable.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like references numerals and symbols designate identical or corresponding parts throughout the several views and wherein.

DETAILED DESCRIPTION OF THE INVENTION

Figure 1:
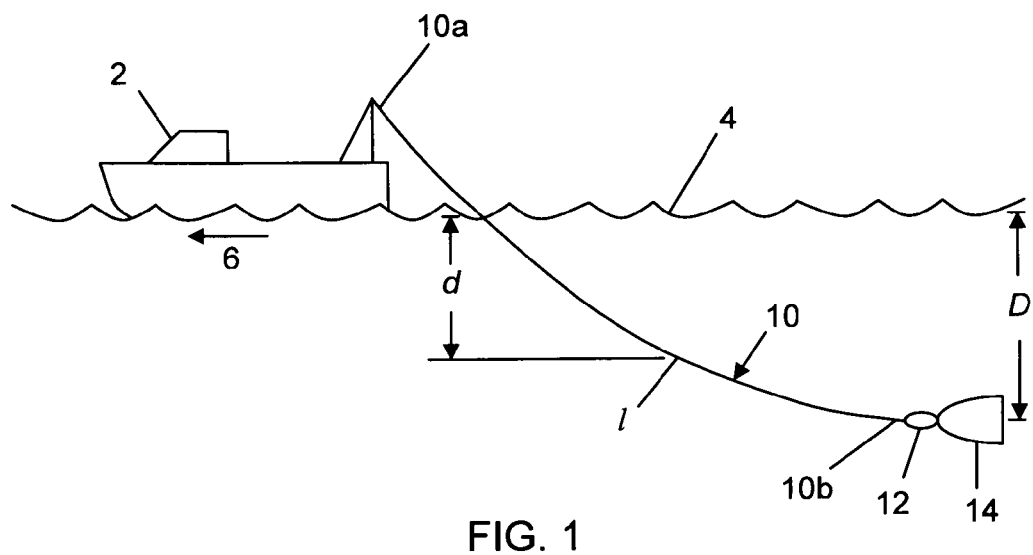
FIG. 1 illustrates a vessel with a deployed Instrumented Tow Cable (ITC)

Referring now to FIG. 1, there is shown a view of vessel 2 towing ITC 10. Near end 10a of the ITC 10 is attached to the vessel 2 and distal end 10b of the ITC is at depth "D" below air/sea interface 4. Depth sensor 12 is connected to the distal end 10b and communicates the depth D of the distal end 10b to the vessel 2.

The ITC 10 measures the temperature along a length of the ITC using light scattered from optical fibers integrated into the ITC. Using optical time domain reflectometry (OTDR) techniques, as are known to those ordinarily skilled in the art, the location of each measurement along the length of the ITC 10 can be determined. Typical ITCs have a spatial resolution of one half to one meter along the cable. Temporal resolution of ITCs is in the range of two to three minutes, with a series of measurements being averaged over that time period.

To obtain temperature measurements at various depths below the interface 4, a heavy and variable depth body 14 is connected to the distal end 10b. The body 14 maintains the distal end 10b below the interface 4. Thus, a temperature measurement at a known location along the length of the ITC 10 corresponds to a certain depth "d" beneath the interface 4 and a temperature profile can be obtained.

Generally, those of skill in the art assume that the ITC 10 forms a catenary, the shape of which depends on the speed at which the ITC is towed. Thus, the relationship between/and d can be computed using known catenary formulas based on the known total length of the ITC 10, the depth D of the body 14 (determined using the depth sensor 12) and the tow speed, indicated by direction arrow 6. However, such computed catenaries are subject to errors due to underwater currents, tow speed errors and the like. The accuracy of the computed catenaries can be improved by determining the point along the ITC 10 that passes through the air/sea interface 4.

Figure 2:
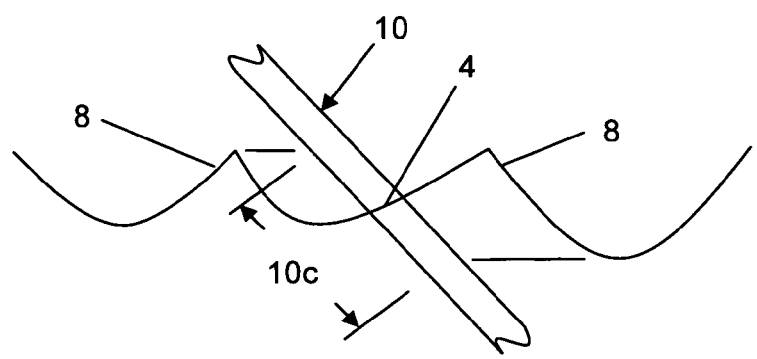
FIG. 2 illustrates a more detailed view at the air/sea interface of the ITC.

Referring now to FIG. 2, a detailed view of section 10c of the ITC 10 at the air/sea interface 4 is illustrated. Due to wave motion at the air/sea interface 4 (illustrated by waves 8) and pitching of the vessel 2 (not shown in FIG. 2), which moves the ITC 10 up and down, the section 10c is exposed to both air and water. A typical period for ocean waves and ship pitching is about five seconds. Thus, the alternation between air and water can happen multiple times over a three minute measurement period.

As previously described, the ITC 10 obtains a series of temperature measurements over a two-to-three minute measurement period. Typically, the series of measurements can be averaged to obtain the temperature measurement for the period. Due to the movement of the section 10c above and below the interface 4, the variance of the series of measurements for the section 10c is found to be greater than that of other sections of the ITC 10.

Using a sliding variance across the entire length of the ITC 10, the peak variance can be determined. The location of the peak variance corresponds to the location of the section 10c along the ITC 10. This information can be included in the catenary computations, resulting in more accurate temperature profiles.

Figure 3:
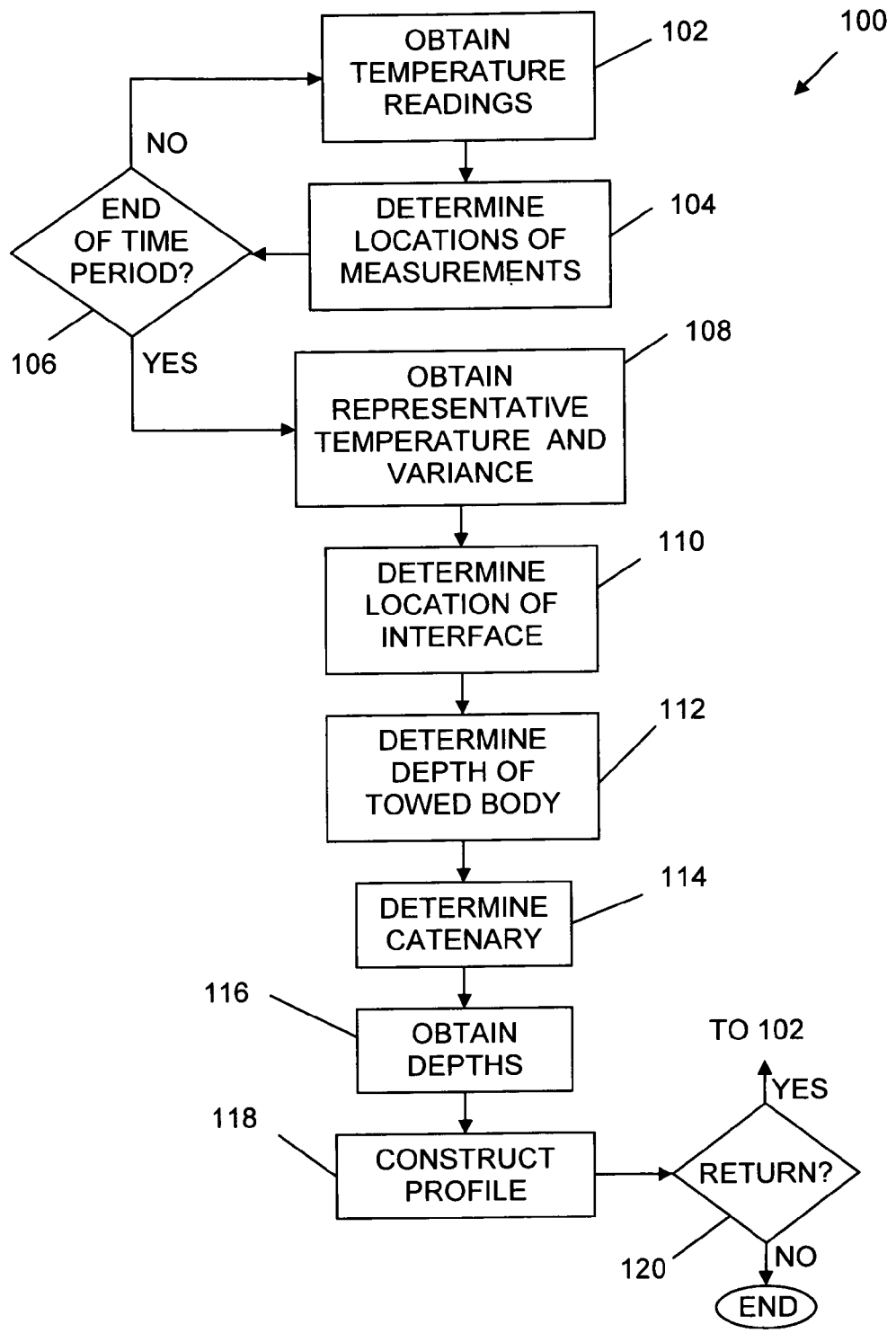
FIG. 3 is a block diagram of a method for determining the location of the air/sea interface on the ITC.

Referring now to FIG. 3, there is shown a block diagram of method 100 for determining a location of an air/sea interface. As is known in the art, temperature readings are obtained (Step 102) at a number of measurement cells along an ITC, such as the ITC 10 of FIG. 1. Known OTDR techniques are used to determine the location of each measurement, as at Step 104. Additional readings are obtained at each location for a predetermined time period, as indicated at Step 106.

Using the multiple readings, a representative temperature and an estimation of variance of the temperature readings in proximity of each location are obtained, as indicated at Step 108. The representative temperature may be determined based on an average of the multiple readings at a location. The variance estimations are obtained over sliding windows along the length of the ITC using variance estimation techniques well known in the art. The parameters used in the sliding windows variance estimations will depend on the spatial resolution of the ITC.

In general, the window size that is selected for variance calculation is at least twelve times larger than the spatial resolution of the measurement. This provides an ensemble of at least twelve independent measurements to go into the variance calculation. An ensemble size of at least twelve samples is necessary for meaningful statistical tests. The overlap that used for successive windows can vary, but 50% overlap is a typical value used such that the peak variance can be resolved.

The location along the ITC corresponding to the air/sea interface is determined (Step 110) based on having the largest variation. The depth of the heavy and variable depth body being towed by the ITC is determined (Step 112) using a depth sensor located on or near the body. The catenary for the ITC 10 is determined (Step 114) based on the total length of the ITC, the depth, the tow speed and the location of the air/sea interface.

Based on the locations determined at the Step 104 and the catenary obtained at the Step 114, the depths of each location can be obtained (Step 116). A profile of the representative temperature with depth then can be constructed for the predetermined time period, as indicated at Step 118 and for each succeeding time period, as indicated by return Step 120.

What have thus been described are a method and system for detecting the location of the air/sea interface on an ITC during distributed temperature measurements. OTDR techniques can determine the precise location of each temperature measurement along the cable length. The air/sea interface is determined by estimating the variance of the temperature measurements in the proximity of each measurement location using a sliding variance across the entire cable length. The location of the air/sea interface is determined based on the location of the peak variance.

The location of the air/sea interface is used in determining the catenary of the ITC. In turn, the catenary provides the relationship between a location on the ITC and the depth of that location below the interface. Accordingly, a temperature in relation to depth profile can be constructed.

The method and system described herein also provide for an enhanced ability to determine the catenary of an ITC and, hence, a more accurate temperature in relation to depth profile. Additionally, the method can be easily automated. Known algorithms for computing sliding variance, as well as catenary computations, can be incorporated into processors currently employed in obtaining and converting raw ITC temperature data. Thus, the method described herein can be automated and a temperature in relation to depth profile can be displayed directly to a system operator.

Obviously many modifications and variations of the present invention may become apparent in light of the above teachings. For example, over the predetermined time period, the representative temperature can be taken as the mean of the temperature readings. Alternatively, the representative temperature can be determined by other known mathematical techniques, such as geometric mean or mode.

The method described can be generalized to perform boundary detection across OTDR-based temperature measurements other than that of an air/sea interface. As an example, the air/liquid interface of a mixing vat may be obtained using the methods described herein. In environments having little or no wave action, the ITC can be moved in an up and down motion such that air and liquid temperatures at the interface can be sampled over one section of the ITC.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method for determining a position of an interface along a temperature sensing cable passing through the interface, said method comprising the steps of:
   obtaining multiple temperature readings at each of a plurality of measurement cells along the cable;
   determining locations of the measurement cells along the cable;
   obtaining variance estimations in proximity to each of the locations based on the multiple temperature readings; and
   determining the position of the interface based on a position having a largest variance estimation.

2. The method of claim 1, wherein said step of obtaining variance estimations comprises obtaining variance estimations over sliding windows along the cable.

3. The method of claim 2, further comprising the step of obtaining a representative temperature for each of the locations based on the multiple temperature readings.

4. The method of claim 3, wherein said step of obtaining the representative temperature comprises obtaining at least one of an average, an arithmetic mean, a geometric mean and a mode of the multiple temperature readings at each of the plurality of measurement cells.

5. The method of claim 4, wherein said step of determining location is through optical time domain reflectometry.

6. The method of claim 1, further comprising the step of obtaining at least one of an average, an arithmetic mean, a geometric mean and a mode of the multiple temperature readings at each of the plurality of measurement cells.

7. The method of claim 1, wherein said step of determining locations are through optical time domain reflectometry.

8. The method of claim 1, said method further comprising the steps of:
   determining a base depth of an end of the cable beneath the interface; and
   determining a catenary describing a shape of the cable based partially on the base depth and the position of the cable.

9. The method of claim 8, said method further comprising the steps of:
   obtaining depths of the locations beneath the interface based on the catenary;
   obtaining representative temperatures for the locations based on the multiple temperature readings; and
   constructing a temperature in relation to depth profile based on the representative temperatures and the depths of the locations.

10. The system of claim 9, wherein said step of obtaining the representative temperatures comprises obtaining at least one of an average, an arithmetic mean, a geometric mean and a mode of the multiple temperature readings at each of the plurality of measurement cells.

11. The system of claim 10, wherein said step of determining the base depth comprises obtaining a reading from a depth sensor.

12. The system of claim 11, wherein said step of determining a catenary is based on at least one of a tow speed of the cable and a length of the cable.

13. The method of claim 12, wherein said step of obtaining variance estimations comprises obtaining variance estimations over sliding windows along the cable.

14. A processor program product disposed on a processor readable medium and having instructions for causing at least one processor to:
receive multiple temperature readings from each of a plurality of measurement cells along a temperature sensing cable;
determine locations of the measurement cells along the cable based on optical time domain reflectometry;
obtain variance estimations over sliding windows along the cable in proximity of each of the locations based on the multiple temperature readings; and
determine a position along the cable of an interface through which the cable passes, based on the position having a largest of the variance estimations.

15. The processor program product of claim 14, said product further having instructions for causing the one processor to:
receive a base depth reading from a depth sensor at an end of the cable beneath the interface;
determine a catenary describing a shape of the cable based at least in part on the base depth and the position;
determine depths of the locations beneath the interface based on the catenary;
determine representative temperatures for the locations based on the multiple temperature readings; and
construct a temperature in relation to depth profile based on the representative temperatures and the depths of the locations.

16. The processor program product of claim 15, further having instructions for causing the one processor to determine the representative temperatures based on at least one of an average, an arithmetic mean, a geometric mean and a mode of the multiple temperature readings at each of the plurality of measurement cells.

17. The processor program product of claim 16, further having instructions for causing the one processor to determine the catenary based on a tow speed of the cable and a length of the cable.

* * * * *